United States Patent
Yoshinobu et al.

(10) Patent No.: US 12,291,466 B2
(45) Date of Patent: May 6, 2025

(54) WATER PURIFYING FILTER AND WATER PURIFIER USING SAME

(71) Applicant: KURARAY CO., LTD., Kurashiki (JP)

(72) Inventors: Hiroe Yoshinobu, Okayama (JP); Tetsuya Hanamoto, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 857 days.

(21) Appl. No.: 17/416,537

(22) PCT Filed: Dec. 24, 2019

(86) PCT No.: PCT/JP2019/050557
§ 371 (c)(1),
(2) Date: Jun. 21, 2021

(87) PCT Pub. No.: WO2020/138054
PCT Pub. Date: Jul. 2, 2020

(65) Prior Publication Data
US 2022/0081322 A1 Mar. 17, 2022

(30) Foreign Application Priority Data
Dec. 28, 2018 (JP) .................................. 2018-246935

(51) Int. Cl.
*C02F 1/28* (2023.01)
*B01J 20/20* (2006.01)
(Continued)

(52) U.S. Cl.
CPC ............... *C02F 1/283* (2013.01); *B01J 20/20* (2013.01); *B01J 20/28004* (2013.01);
(Continued)

(58) Field of Classification Search
CPC ...... B01D 35/02; B01D 39/2062; B01J 20/20; B01J 20/28; B01J 20/28004;
(Continued)

(56) References Cited

U.S. PATENT DOCUMENTS

| | | | |
|---|---|---|---|
| 2009/0022632 A1* | 1/2009 | de Broqueville | .......... B01J 8/36 422/140 |
| 2012/0132578 A1 | 5/2012 | Yoshinobu et al. | |
| 2014/0060727 A1 | 3/2014 | Stouffer et al. | |

FOREIGN PATENT DOCUMENTS

| | | |
|---|---|---|
| JP | 2010162492 A | 7/2010 |
| JP | 2016140788 A | 8/2016 |

(Continued)

OTHER PUBLICATIONS

Machine translation of Ishikawa et al. (Year: 2016).*
(Continued)

*Primary Examiner* — Brian A McCaig
(74) *Attorney, Agent, or Firm* — Element IP, PLC

(57) ABSTRACT

One aspect of the present invention relates to a water purification filter including: a first support member; an activated carbon layer containing activated carbon and a fibrous binder; and a second support member. A 10% particle diameter (D10) of the activated carbon in a cumulative size distribution at volume standard is 19 to 90 μm, a 50% particle diameter (D50) of the activated carbon in the cumulative size distribution at volume standard is 120 to 180 μm, and a 90% particle diameter (D90) of the activated carbon in the cumulative size distribution at volume standard is 180 to 250 μm. The first support member has an airflow resistance of 0.5 to 10 mm $H_2O$. The second support member has an airflow resistance of 0.5 to 7 mm $H_2O$. The activated carbon layer has a thickness of 3 to 10 mm.

5 Claims, 4 Drawing Sheets

(51) Int. Cl.
*B01J 20/28* (2006.01)
*C02F 101/20* (2006.01)
*C02F 101/36* (2006.01)

(52) U.S. Cl.
CPC ..... *B01J 20/2803* (2013.01); *B01J 20/28042* (2013.01); *C02F 2101/20* (2013.01); *C02F 2101/36* (2013.01)

(58) Field of Classification Search
CPC .. B01J 20/2803; B01J 20/28042; C02F 1/283; C02F 2101/20; C02F 2101/36
See application file for complete search history.

(56) References Cited

FOREIGN PATENT DOCUMENTS

| JP | 2018111099 A | 7/2018 | |
|---|---|---|---|
| WO | WO-2009140033 A2 * | 11/2009 | ......... B01D 39/2062 |
| WO | WO-2010150534 A1 | 12/2010 | |
| WO | WO-2011016548 A1 | 2/2011 | |
| WO | WO-2016017754 A1 * | 2/2016 | ........... B01D 17/045 |
| WO | WO-2016121590 A1 * | 8/2016 | ............ B01D 39/14 |

OTHER PUBLICATIONS

Machine translation of Fujita et al. (Year: 2016).*
International Search Report issued Mar. 17, 2020 in PCT/JP2019/050557, 2 pages.

* cited by examiner

WATER PURIFYING FILTER AND WATER PURIFIER USING SAME

TECHNICAL FIELD

The present invention relates to a water purification filter including activated carbon, and to a purifier using the same.

BACKGROUND ART

In recent years, safety and hygienic concerns have increased with regard to water quality of tap water, and it has been desired to remove harmful substances contained in tap water, such as free residual chlorine, VOC (volatile organic compounds) including trihalomethanes, leads, agricultural chemicals, and musty odors.

In particular, chlorine which is used in tap water or the like for preventing propagation of bacteria is not a nontoxic substance, and when hair or skin is washed with tap water having a high residual chlorine concentration, the protein of the hair or skin may be denatured and damaged. A slight amount of trihalomethane which is dissolved in tap water is suspected to be a carcinogenic substance. In recent years, with enhanced health trend, removal of trihalomethane and other substances from the tap water by using a purifier has been desired.

Purifiers capable of performing gravity filtration, such as pitcher-type water purifiers and purified water dispensers, have been known as ways for purifying tap water in addition to purifiers to be attached to faucets. For example, Patent Literature 1 discloses a water purification cartridge including: a casing filled with a depurative; and a cartridge main body having a water inlet for introducing water.

The water purification cartridge includes, inside the casing accommodating the cartridge, a predetermined package member (a vacuum-degassed package member, a package member filled with water, or a package member filled with a carbon dioxide gas) for introducing water more smoothly without an influence of bubbles which impede a flow of water.

However, the purifiers capable of performing gravity filtration have been desired to have an improved removal rate of harmful substances and turbidness. Moreover, there has been a high demand on purifiers available for a long time.

Under the circumstances, water purification filters capable of performing gravity filtration with less clogging while keeping an excellent filtration (removal) capability on the turbidness and the harmful substances have currently been demanded.

CITATION LIST

Patent Literature

Patent Literature 1: Japanese Unexamined Patent Publication No. 2010-162492

SUMMARY OF INVENTION

The present inventor has found that a configuration to be described below could solve the aforementioned drawbacks after a great deal of studies for water purification filters in detail, then reconsidered the studies under the found knowledge, and finally completed the present invention.

Specifically, a water purification filter according to one aspect of the present invention includes: a first support member; an activated carbon layer containing activated carbon and a fibrous binder; and a second support member. A 10% particle diameter (D10) of the activated carbon in a cumulative size distribution at volume standard is 19 to 90 µm, a 50% particle diameter (D50) of the activated carbon in the cumulative size distribution at volume standard is 120 to 180 µm, and a 90% particle diameter (D90) of the activated carbon in the cumulative size distribution at volume standard is 180 to 250 µm. The first support member has an airflow resistance of 0.5 to 10 mm $H_2O$. The second support member has an airflow resistance of 0.5 to 7 mm $H_2O$. The activated carbon layer has a thickness of 3 to 10 mm.

DESCRIPTION OF EMBODIMENTS

Figure 1:
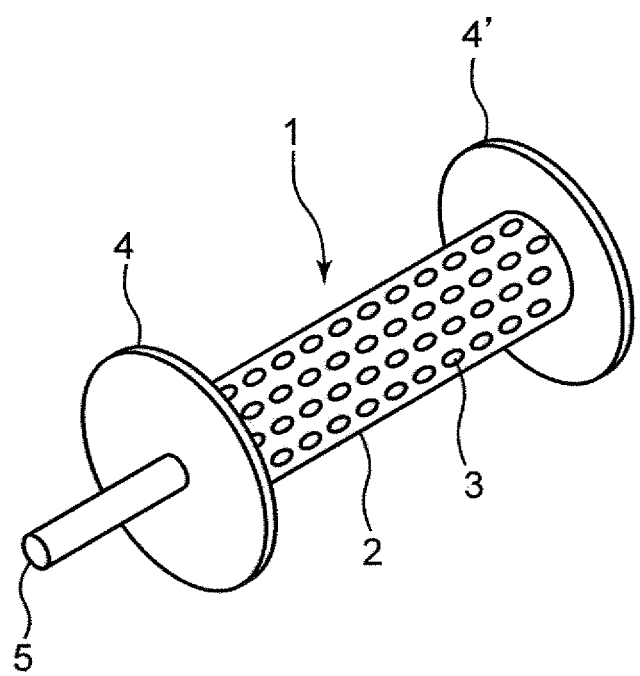
FIG. 1 shows a perspective view of a mold for preparing an adsorption filter according to the embodiment.

Hereinafter, embodiments according to the present invention will be described, but the present invention should not be limited thereto.

Water Purification Filter

A water purification filter according to the embodiment includes: a first support member; an activated carbon layer containing activated carbon and a fibrous binder; and a second support member. A 10% particle diameter (D10) of the activated carbon in a cumulative size distribution at volume standard is 19 to 90 µm, a 50% particle diameter (D50) of the activated carbon in the cumulative size distribution at volume standard is 120 to 180 µm, and a 90% particle diameter (D90) of the activated carbon in the cumulative size distribution at volume standard is 180 to 250 µm. The first support member has an airflow resistance of 0.5 to 10 mm $H_2O$. The second support member has an airflow resistance of 0.5 to 7 mm $H_2O$. The activated carbon layer has a thickness of 3 to 10 mm.

This configuration can provide a water purification filter having an excellent liquid permeability and high adsorption performance, in particular, having an excellent filtration (removal) capability on harmful substances, such as chloroform and soluble lead, and turbidness, and further being unlikely to cause clogging.

Configurations of the water purification filter according to the embodiment will be described below.

Activated Carbon Layer

An activated carbon layer in the embodiment contains activated carbon and a fibrous binder.

The activated carbon contained in the activated carbon layer in the embodiment is not particularly limited as long as the 10% particle diameter (D10) of the activated carbon in a cumulative size distribution at volume standard is 19 to 90 µm, the 50% particle diameter (D50) of the activated carbon in the cumulative size distribution at volume standard is 120 to 180 µm, and the 90% particle diameter (D90) of the activated carbon in the cumulative size distribution at volume standard is 180 to 250 μm. Use of the activated carbon in which all the D10, D50, and D90 have the particle diameters falling within the aforementioned ranges can yield a water purification filter having an excellent liquid permeability and high adsorption performance, in particular, having an excellent filtration (removal) capability on harmful substances, such as chloroform and soluble lead, and turbidness.

In the embodiment, each of the D10, D50, and D90 indicates the numeric value measured with a laser diffraction and scattering method, and is measurable by, for example, a wet particle size distribution measurement device (Microtrac MT-3300EX II) manufactured by MicrotracBEL Corporation.

Meanwhile, in a case where an activated carbon layer contains a plurality of kinds of activated carbon defined as an activated carbon mixture, particle diameters of the mixture are measured, and the measured values are defined as D10, D50, and D90.

The D10 is preferably 25 to 80 μm, and more preferably 30 to 40 μm. The D50 is preferably 125 to 155 μm, and more preferably 140 to 150 μm. The D90 is preferably 200 to 220 μm, more preferably 205 to 220 μm, and even more preferably 210 to 220 μm.

Any commercially available activated carbon is adoptable as long as all the D10, D50, and D90 fall within the ranges. For instance, activated carbon obtained by carbonizing and/or activating a carbonaceous material can also be used. When the carbonization is necessary, the carbonization may be typically performed, for example, at a temperature of about 400 to 800° C., preferably about 500 to 800° C., and more preferably about 550 to 750° C., in the absence of oxygen or air. Available activation methods range from a gas activation method to a chemical activation method. The gas activation method and the chemical activation method may be used in combination. Particularly, when the filter is used for water purification, the gas activation method is preferable because of leaving a less amount of residual impurities. The gas activation method may be typically performed, for example, by causing a carbonized carbonaceous material to react with an activation gas (e.g., water vapor, carbon dioxide gas) at a temperature of about 700 to 1100° C., preferably about 800 to 980° C., and more preferably about 850 to 950° C. In consideration of safety and reactivity, the activation gas is preferably a water-vapor-containing gas containing 10 to 40% by volume of water vapor. The activation time and temperature-raising speed are not particularly limited and can be appropriately selected depending on the kind, shape, and size of a carbonaceous material to be selected.

The carbonaceous material is not particularly limited. Examples of the carbonaceous material include plant-series carbonaceous materials (e.g., materials derived from plants, such as wood, sawdust, charcoal, fruit shell such as coconut shell or walnut shell, fruit seed, by-product of pulp production, lignin, and waste molasses), mineral-series carbonaceous materials (e.g., materials derived from minerals, such as peat, lignite, brown coal, bituminous coal, anthracite coal, coke, coal tar, coal tar pitch, petroleum distillation residue, and petroleum pitch), synthetic resin-series carbonaceous materials (e.g., materials derived from synthetic resins, such as a phenolic resin, polyvinylidene chloride, and an acrylic resin), and natural fiber-series carbonaceous materials (e.g., materials derived from natural fibers, such as natural fiber like cellulose, and regenerated fiber like rayon). These carbonaceous materials may be used alone or in combination of two or more. Among these carbonaceous materials, coconut shell or a phenolic resin is preferable in view of the fact that such a material easily forms micropores which are involved in the adsorption performance of volatile organic compounds defined in JIS S3201(2010).

After activation, the activated carbon may be washed for removing ash components or chemical agents, particularly when a plant-series carbonaceous material, such as coconut shell, or a mineral-series carbonaceous material is used. For the washing, a mineral acid or water is preferably used. The mineral acid is preferably hydrochloric acid having high washing efficiency.

The shape of the activated carbon in the embodiment may be any shape, e.g., a powder shape, a particle shape, and other shape, and can be appropriately selected in accordance with the purpose of use as long as each particle diameter satisfies the aforementioned definition. However, too fine particles may reduce the liquid permeability, and accordingly, each particle diameter is preferably not too small.

Furthermore, the activated carbon in the embodiment preferably has a benzene adsorption performance of about 20 to 40%. If the benzene adsorption performance is less than 20%, it may be impossible to retain sufficient adsorption capability. If the benzene adsorption performance exceeds 40%, the pore size increases in an overactivated state, which tends to cause a reduced adsorption retention force of the harmful substances. Therefore, in the adsorption filter (water purification filter) according to the embodiment, the benzene adsorption performance preferably falls within the above range. More preferably, the benzene adsorption performance is about 22 to 35%

In the embodiment, with reference to the description of JIS K 1474 (1991) which is an activated carbon test method in Japanese Industrial Standards, the benzene adsorption performance means a benzene saturation adsorption amount obtained from a weight increase of a sample when air containing solvent vapor having a concentration of $1/10$ of a solvent saturation concentration is caused to pass through the filter at 25° C., and a mass is constant.

A fibrous binder used in the adsorption filter according to the embodiment is not particularly limited as long as the activated carbon can be entangled and shaped, so that a wide variety of binders including synthetic binders and natural binders can be used. Examples of such binders include acrylic fibers, polyethylene fibers, polypropylene fibers, polyacrylonitrile fibers, cellulose fibers, nylon fibers, aramid fibers, and pulp. The fiber length of the fibrous binder is preferably 4 mm or less.

These fibrous binders may be used in combination of two or more. Particularly preferably, a polyacrylonitrile fiber or a cellulose fiber is used as the binder. This can further increase the molded body density and the molded body strength to suppress deterioration in the performance.

In the embodiment, the water-passing property of the fibrous polymer binder is about 10 to 150 mL in terms of a CSF value. More preferably, the water-passing property is about 20 to 110 mL. In the embodiment, the CSF value is a value obtained by measurement in accordance with JIS P8121 (2012) "Pulps-Determination of Drainability" Canadian Standard Freeness Method. The CSF value can be adjusted, for example, by fibrillating the binder.

The adsorption filter according to the embodiment may contain functional components other than the above as long as the effects of the present invention are not inhibited. For example, a titanosilicate or zeolite-based powder (lead adsorbent), an ion-exchange resin, or a chelate resin each capable of removing soluble lead by adsorption, or various kinds of adsorption materials containing a silver ion and/or a silver compound for imparting antimicrobial property, or the like may be added in arbitrary amounts. However, these are typically blended at 0.1 to 30 parts by mass based on the whole adsorption filter.

A mixing ratio of each component in the adsorption filter according to the embodiment is preferably set such that the fibrous binder is contained at about 3 to 8 parts by mass based on 100 parts by mass of the activated carbon or the mixture of the activated carbon and the functional components in view of the effect of adsorbing the harmful substances, the moldability, and the like. When the amount of the fibrous binder is less than 3 parts by mass, sufficient strength may not be obtained, to cause a possibility that the molded body cannot be molded. When the amount of the fibrous binder exceeds 8 parts by mass, the adsorption performance may be deteriorated. More preferably, the fibrous binder is desirably blended at 3.5 to 6 parts by mass.

In the water purification filter according to the embodiment, the activated carbon layer has a thickness of 3 to 10 mm. When the thickness is less than 3 mm, a sufficient harmful substance removal performance is unobtainable. When the thickness exceeds 10 mm, the liquid permeability of the filter is insufficient, and thus the flow rate is too low. This filter is thus unavailable as a water purification filter. The thickness of the activated carbon layer is more preferably about 4 to 8 mm.

First Support Member

The water purification filter according to the embodiment may have a cylindrical shape or a disc shape. The filter further includes, in each of the shape cases, the first support member for reinforcing the activated carbon layer.

When the filter has the cylindrical shape, the first support member may serve as a core of the activated carbon layer formed into the cylindrical shape. When the filter has the disc shape, the first support member is arranged on one of a surface and a back surface of the activated carbon layer formed into the disc shape. The water purification filter according to the embodiment preferably has the cylindrical shape. With this shape, the water flow resistance can be lowered. Furthermore, the filter is advantageous when being used as a cartridge accommodated in a housing in that the cartridge is easily mountable and replaceable with respect to a water purifier.

The first support member available in the embodiment has an airflow resistance of 0.5 to 10 mm $H_2O$. In the embodiment, the term "airflow resistance" means a pressure loss at an airflow rate of 10 L/min in an effective filtration area of 13.5 $cm^2$. An airflow resistance exceeding 10 mm $H_2O$ leads to a too large water flow resistance, resulting in a failure to obtain a sufficient flow rate under the gravity filtration. An airflow resistance falling below 0.5 mm $H_2O$ may cause a part of particles blended at the time of molding the filter to pass through the first support member in forming the activated carbon layer, resulting in a material loss. The airflow resistance of the first support member is thus preferably 1 to 8 mm $H_2O$.

Other configurations (e.g., material quality) of the first support member are not particularly limited as long as the first support member can reinforce the activated carbon layer. For instance, adoptable are a non-woven fabric, a net, and a porous sheet each composed of a polyester resin, a polyethylene resin, a polypropylene resin, a vinylon resin, an aramid resin, a nylon resin, a vinyl chloride resin, or a mixed resin in combination of two or more of these resins. The non-woven fabric or the net may be subjected to a welding process. The non-woven fabric is preferable among these resins from the viewpoints of strength, liquid permeability, and workability.

In the embodiment, the first support member preferably has a thickness of about 0.2 to 2.0 mm. With this thickness, a water purification filter having higher strength is obtainable. The thickness more preferably ranges from about 0.4 to 1.5 mm.

Second Support Member

The water purification filter according to the embodiment includes a second support member for further reinforcing the activated carbon layer. The second support member has an airflow resistance of 0.5 to 7 mm $H_2O$. An airflow resistance exceeding 7 mm $H_2O$ may lead to a too large water flow resistance, resulting in a failure to obtain a sufficient flow rate under the gravity filtration. An airflow resistance falling below 0.5 mm $H_2O$ may cause activated carbon powders to come off from the activated carbon layer. The filter is thus prospected to get dirty due to the activated carbon mixed with filtered water or activated carbon powders having come off during transportation. The airflow resistance of the second support member is more preferably 2 to 6 mm $H_2O$.

When the water purification filter has the cylindrical shape in the embodiment, the second support member is arranged on an outer circumference of the activated carbon layer to reinforce the activated carbon layer. When the filter has the disc shape, the second support member is arranged on the other of the surface and the back surface of the activated carbon layer formed into the disc shape, the other surface being opposite to the one surface on which the first support member is arranged. In other words, the activated carbon layer sandwiched between the first support member and the second support member is reinforced, in each of the shape cases, on the inner and outer circumferences thereof, or on the surface and the back surface thereof.

Other configurations (e.g., material quality) of the second support member are not particularly limited as long as the second support member can reinforce the activated carbon layer. For instance, adoptable are a non-woven fabric composed of a polyester resin, a polyethylene resin, a polypropylene resin, a vinylon resin, an aramid resin, a nylon resin, or a mixed resin in combination of two or more of these resins, and a resin net. The non-woven fabric is preferable among these resins from the viewpoints of liquid permeability, economy, and workability.

In the embodiment, the second support member preferably has a thickness of about 0.05 to 0.5 mm. With this thickness, a water purification filter having higher strength is obtainable. The thickness more preferably ranges from about 0.1 to 0.4 mm.

Production Method

Any method is adoptable for producing the adsorption filter according to the embodiment without particular limitation. A slurry suction method is preferable from the viewpoint of its high production efficiency.

Hereinafter, as an example, a method for producing the cylindrical filter according to the embodiment will be described in detail. However, the present invention should not be limited thereto.

Specifically, for example, a molded body of the cylindrical activated carbon layer is obtainable with a production method including: a slurry preparation step of preparing a slurry by dispersing activated carbon and a fibrous binder in water; a suction step of suctioning and filtering the slurry to obtain a preform; a drying step of drying the preform to obtain a dried molded body; a rolling step of adjusting a shape of an outer surface of the preform subjected to the suction by compressing the preform on a shaping bench, if necessary; and a grinding step of grinding an outer surface of the molded body. Each of the reference numerals and signs shown in the drawings and to be used in the description below denotes the following elements:

1: mold for preparing molded body;
2: core body;
3: suction hole;
4, 4': flange;
5: filtrate discharge port;
6: molded body;
7: slurry;
11: grinder;
12, 17: rotational shaft;
13: disc-shaped grindstone;
14, 18: motor;
15, 16: air cylinder;
19: operation panel; and
20: molded body.

Slurry Preparation Step

According to the embodiment, in the slurry preparation step, a slurry is prepared in which the powdery activated carbon and the fibrous binder are dispersed in a solvent so that the slurry contains 4 to 8 parts by mass of the fibrous binder based on 100 parts by mass of the activated carbon and has a solid content concentration of 0.1 to 10% by mass (particularly preferably 1 to 5% by mass). The solvent is not particularly limited. However, water or the like is preferably used. If the solid content concentration of the slurry is too high, the dispersion is apt to be nonuniform, so that mottles are apt to be disadvantageously generated in the molded body. Meanwhile, if the solid content concentration is too low, the molding time is prolonged to not only lower the productivity.

Suction Step

Figure 3:
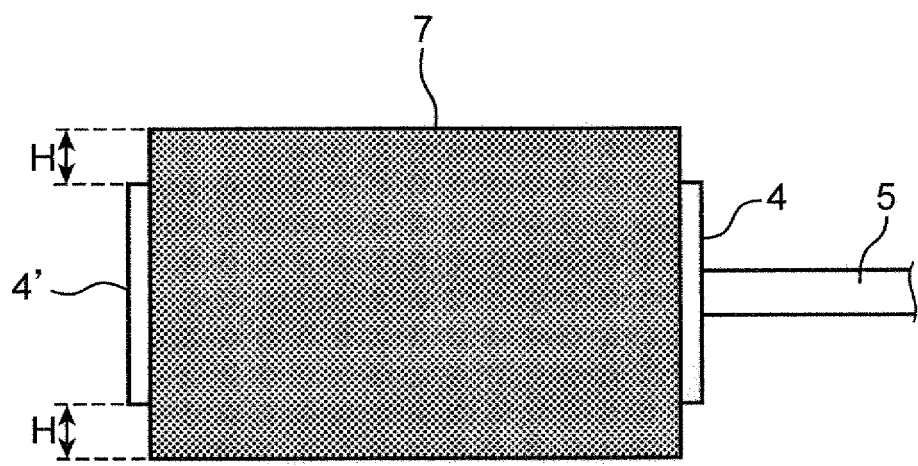
FIG. 3 shows an exemplary preform obtained by suctioning a slurry for adsorption filter by using the mold shown in FIG. 1.

Next, in the suction step, for example, as shown in FIG. 1, the above-described first support member (core) is attached to a cylindrical molding mold 1 having a large number of suction holes 3 in the surface of a core body 2 and having flanges 4, 4' attached to both ends thereof. The mold 1 is put into the slurry, and the slurry is adhered to the mold 1 by filtering the slurry from the inside of the mold via a filtrate discharge port 5 while suctioning the slurry. As the suction method, a conventional method, for example, a method for performing suction using a suction pump or the like can be utilized. As shown in FIG. 3, the slurry is adhered to the mold 1 in such an amount that R+(H×2) is about 105 to 125% with respect to the diameter R of the flanges 4 and 4' of the mold 1. For example, when the diameter of the flange is 38 mm, the H is preferably about 1 to 5 mm.

Rolling Step

In the embodiment, the rolling step may be performed after the suction step if necessary. In the rolling step, the mold 1 is placed on a bench in a state where the preform obtained in the suction step is adhered. A pressing tool having a surface which can press with a predetermined force is used to move the preform back and forth while pressing the preform on the bench. Thus, while the outer diameter of the preform is adjusted to a predetermined size, the roundness is increased and the irregularities of the outer peripheral surface are reduced. After rolling, the preform is removed from the mold.

Drying Step

The preform is generated in the suction step or the rolling step. Thereafter, the flanges 4, 4' at both ends of the mold 1 are removed, and the core body 2 is removed to thereby obtain a hollow cylindrical molded body.

Figure 2:
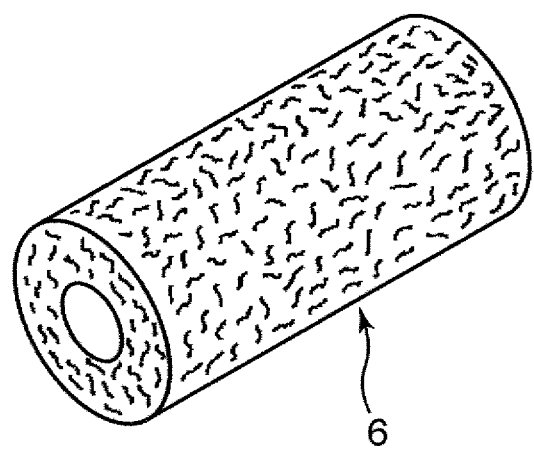
FIG. 2 is a perspective view showing an exemplary molded body including a first support member and an activated carbon layer, the molded body being obtainable by using the mold of FIG. 1.

Subsequently, in the drying step, the preform removed from the mold can be dried by a drier or the like to obtain a molded body including the first support member and the activated carbon layer as shown in FIG. 2.

The drying temperature is, for example, about 100 to 150° C. (particularly about 110 to 130° C.). The drying time is, for example, about 4 to 24 hours (particularly about 8 to 16 hours). If the drying temperature is too high, degeneration or melting of the fibrous binder occurs, so that the molded body is apt to have low filtration performance or low strength. If the drying temperature is too low, the drying time may be prolonged, or the drying may become insufficient.

Grinding Step

If necessary, a grinding step may be performed after the drying step to further adjust the outer diameter of the molded body or to reduce the irregularities of the outer circumference. The grinding way to be used in the embodiment is not particularly limited as long as an outer surface of the dried molded body can be ground (or polished), and thus a conventional grinding method may be used. However, from the viewpoint of uniform grinding, a method is preferable, in which a grinder for grinding the molded body by rotating the molded body itself is used.

The grinding step is not limited to the method using a grinder. For example, the molded body fixed to the rotation shaft may be ground by a fixed plate-shaped grindstone. In this method, since the generated grinding shavings are apt to accumulate on the ground surface, the grinding with air blowing is effective.

Attachment Step of Attaching Second Support Member

Finally, the water purification filter according to the embodiment can be obtained by cutting the molded body into a desired shape and attaching the second support member (e.g., non-woven fabric) onto the surface of the molded body. A method for attaching the second support member is not particularly limited. For instance, a sheet of non-woven fabric is wound on an outer circumference of the molded body and the overlapping ends of the sheet of non-woven fabric are thermally welded to each other to thereby achieve the attachment.

Furthermore, if necessary, a cap may be put on the tip portion of the water purification filter. The cap may be, for example, made of resin, and have one opening end and the other closing end.

Purpose of Use of Water Purification Filter

The water purification filter according to the embodiment can be used as a water purification cartridge, for example, by being accommodated in a housing. The cartridge is mounted in a water purifier capable of performing gravity filtration to be subjected to water passing. As a water-passing method, a total filtration method in which a whole amount of raw water is filtered is adopted.

In the case of the cylindrical filter, the water in the water passing may flow from the inside to the outside of the filter, or may flow from the outside to the inside of the filter. In the case of the disc-like filter, water may flow from either the first support member or the second support member.

The cartridge to be mounted in a purifier in the embodiment may be used by, for example, accommodating a water purification filter in the housing. However, the cartridge is further adoptable in combination with each of known non-woven fabric filters, various kinds of adsorption materials, mineral additive materials, ceramic filtering materials, and other materials.

As described above, the present specification discloses techniques of various aspects, among which main techniques are summarized below.

A water purification filter according to one aspect of the present invention includes: a first support member; an activated carbon layer containing activated carbon and a fibrous binder; and a second support member. A 10% particle diameter (D10) of the activated carbon in a cumulative size distribution at volume standard is 19 to 90 μm, a 50% particle diameter (D50) of the activated carbon in the cumulative size distribution at volume standard is 120 to 180 μm, and a 90% particle diameter (D90) of the activated carbon in the cumulative size distribution at volume standard is 180 to 250 μm. The first support member has an airflow resistance of 0.5 to 10 mm $H_2O$. The second support member has an airflow resistance of 0.5 to 7 mm $H_2O$. the activated carbon layer has a thickness of 3 to 10 mm.

This configuration can provide a water purification filter having an excellent liquid permeability and being capable of performing gravity filtration with less clogging while keeping an excellent filtration (removal) capability on turbidness and harmful substances.

In the water purification filter, the first support member preferably has a thickness of 0.2 to 2.0 mm. With this thickness, it is possible to obtain a water purification filter having an excellent moldability and higher strength, and being easy to produce.

In the water purification filter, the first support member is preferably made of non-woven fabric. This configuration can reliably provide the above-described effects.

In the water purification filter, the second support member is preferably made of non-woven fabric. This configuration can reliably provide the above-described effects.

In the water purification filter, the activated carbon layer preferably has a cylindrical shape. The first support member is preferably arranged as a core on an inner circumference of the activated carbon layer. The second support member is preferably arranged on an outer circumference of the activated carbon layer. This configuration is advantageous in that both the good liquid permeability and the high removal performance on harmful substances are easily attainable.

A purifier according to another aspect of the present includes the water purification filter described above.

EXAMPLES

Hereinafter, the present invention will be described in more detail with reference to Examples, but Examples do not delimit the present invention.

First of all, evaluation methods for activated carbon and filters prepared in Examples and Comparative examples to be described later will be explained.

Measurement of Particle Diameters of Activated Carbon

The particle diameters (D10, D50, D90) of the activated carbon were measured with a laser diffraction measurement method. Specifically, the activated carbon to be measured was put in ion-exchanged water together with a surfactant and subjected to ultrasonic vibration to prepare a homogeneous dispersion, and the prepared dispersion was measured by using Microtrac MT-3300EX II manufactured by MicrotracBEL Corporation. For the activated carbon layer formed of a plurality of kinds of activated carbon, particle diameters of a mixture (excluding ATS) in which corresponding activated carbon was mixed at a mixing ratio shown in each of the following Examples and Comparative Examples were measured. As the surfactant, "Polyoxyethylene (10) octylphenyl ether" manufactured by Wako Pure Chemical Industries, Ltd. was used. The analysis conditions are shown below.

Analysis Conditions
  Number of measurements; average value of three measurements
  Measurement time; 30 seconds
  Distribution representation; volume
  Particle size division; standard
  Calculation mode; MT-3000 II
  Solvent name; WATER
  Measurement upper limit; 2000 μm, measurement lower limit; 0.021 μm
  Residual fraction ratio; 0.00
  Passing fraction ratio; 0.00
  Residual fraction ratio setting; invalid
  Particle transmittance; suction
  Particle refractive index; N/A
  Particle shape; N/A
  Solvent refractive index; 1.333
  DV value; 0.0882
  Transmittance (TR); 0.800 to 0.930
  Extension filter; invalid
  Flow rate; 70%
  Ultrasonic output; 40 W
  Ultrasonic time; 180 seconds Airflow Resistance of First Support Member and Second Support Member A pressure loss (airflow resistance) of each of the first support member and the second support member (each made of non-woven fabric) in an effective filtration area of 13.5 $cm^2$ at an airflow rate of 10 L/min was measured by using a filter holder PP-47 manufactured by Advantec Co., Ltd.

Thickness of Activated Carbon Layer

A digital caliper was used to measure a thickness of an activated carbon molded body including the first support member and the second support member. The thickness of the activated carbon layer was calculated by subtracting, from the measured value, the thickness of each of the first support member and the second support member measured in the same manner.

Pretreatment of Filtration Test

A cylindrical water purification filter obtained in each of Examples and Comparative Examples was accommodated in a transparent plastic housing having an average diameter of about 41 mm, a length of about 90.5 mm, and an internal presence amount of about 119.4 ml to serve as a cartridge. A portion of the cylindrical water purification filter at 4 cm from the bottom thereof was immersed in water for twenty minutes. Thereafter, the cartridge was mounted in a pitcher-type water purifier having a structure of causing water to flow from the inside to the outside by way of natural filtration, with reference to JIS S 3201 (2010). A pretreatment was performed for pouring 1.0 L of water into a raw water tank (W14.8 cm×D7.5 cm×H11.7 cm) of the pitcher-type water purifier, filtrating the whole amount of the poured water, and then further pouring another 1.0 L of water.

Initial Filtration Flow Rate Test

After the pretreatment, performed was a filtration flow rate test by continuously supplying raw water (tap water) such that the water surface in the raw water tank could always keep at a height of 11.7 cm. The flow rate of water passing through the water purification filter per minute was measured after a lapse of ten minutes from the start of the supply, and the measured value was defined as an initial filtration flow rate. In this test, an acceptance level was 0.2 L/min or more.

Chloroform Filtration Capability Test

After the pretreatment, performed was a chloroform filtration capability test by continuously supplying test water (tap water) having a chloroform concentration of 60±12 ppb such that the water surface in the raw water tank could always keep at the height of 11.7 cm, with reference to JIS S 3201 (2010). An accumulated water-passing amount at the time when a chloroform removal rate fell below 80% was evaluated as a chloroform filtration capability. Meanwhile, in Comparative Example 7, the initial chloroform removal rate measured after a lapse of 10 minutes from the start of water passing was 78%, and thus failed to reach the target removal rate of 80% or more. Accordingly, the accumulated water-passing amount was defined as "0". In this test, an acceptance level was 200 L or more.

Turbidity Filtration Capability Test
Initial Turbidity Removal Rate

The pretreatment was performed by using degassed water obtained by degassing tap water with a degassing membrane module (a degassing membrane module 20E0240A3 manufactured by Mitsubishi Chemical Co., Ltd.). Next, kaolin of 0.1 to 4 μm produced by Nacalai Tesque, Inc. was added to the degassed water such that the turbidity reached 2.0±0.2 degree to thereby prepare the test water. The degassed water indicates water without a gas having been dissolved in tap water and removed therefrom after subjected to filtration using a degassing membrane filter.

After the pretreatment, a removal rate obtained after the lapse of 10 minutes from the start of water-passing was measured by continuously supplying the test water having the turbidity at 2.0±0.2 degree such that the water surface in the raw water tank could always keep at the height of 11.7 cm, and the measured value was defined as an initial turbidity removal rate, with reference to JIS S 3201 (2010). In this test, an acceptance level of the initial turbidity removal rate was 50% or more.

Turbidity Filtration Capability (Removal Rate (%) and Filtration Flow Rate (L/min) at 200 L) Test The filtration capability test of turbid components was continued in the same manner as the above-described method, and a removal rate and a filtration flow rate at the time when the accumulated water-passing amount reached 200 L was measured. A higher filtration flow rate at 200 L achieved less clogging, and exerted an excellent clogging performance (low clogging performance). In this test, an acceptance level was at a removal rate of 50% or more and at a filtration flow rate of 0.15 L/min or more.

Soluble Lead Filtration Capability Test

After the pretreatment, performed was a soluble lead filtration capability test by continuously supplying test water (tap water) having a soluble lead concentration of 50±5 ppb such that the water surface in the raw water tank could always keep at the height of 11.7 cm, with reference to JIS S 3201 (2010). An accumulated water-passing amount at the time when the removal rate of the soluble lead fell below 80% was evaluated as a soluble lead filtration capability. Meanwhile, in Comparative Example 1, the initial soluble lead removal rate measured after a lapse of 10 minutes from the start of water passing was 75%, and thus failed to reach the target removal rate of 80% or more. Further, in Comparative Example 7, the initial soluble lead removal rate was 61%, and thus failed to reach the target removal rate of 80% or more. Accordingly, the accumulated water-passing amount for each of Comparative Examples was defined as "0". In this test, an acceptance level was 200 L or more.

EXAMPLES

Raw Material for Water Purification Filter
Activated Carbon

A method for preparing activated carbon used as a raw material will be described below.

Granular Activated Carbon A

Coconut shell carbon obtained by carbonizing Philippine coconut shell was activated by steam at 900° C., and an activation time was adjusted to achieve a target benzene adsorption amount. The obtained coconut shell activated carbon was washed with diluted hydrochloric acid and demineralized with ion-exchanged water, thereby obtaining granular activated carbon A (18×42 mesh, benzene adsorption amount: 32 wt %).

Granular Activated Carbon B

Coconut shell carbon obtained by carbonizing Philippine coconut shell was activated by steam at 900° C., and an activation time was adjusted to achieve a target benzene adsorption amount. The obtained coconut shell activated carbon was washed with diluted hydrochloric acid and demineralized with ion-exchanged water, thereby obtaining granular activated carbon B (18×42 mesh, benzene adsorption amount: 27 wt %).

Activated Carbon Samples

Activated carbon samples 1 to 5 were prepared by using the granular activated carbons A and B in the following manner.

Activated Carbon Sample 1

The granular activated carbon A was pulverized by a roll mill, and then classified with a 70×180 mesh sieve to prepare the sample.

Activated Carbon Sample 2

The granular activated carbon A was pulverized by a roll mill, and then classified with a 80×325 mesh sieve to prepare the sample.

Activated Carbon Sample 3

The granular activated carbon A was pulverized by a ball mill to have a D50 value of 100 μm, and then fine powders were removed by using a drying pneumatic classifier to prepare the sample.

Activated Carbon Sample 4

The granular activated carbon A was pulverized by a ball mill to have a D50 value of 20 μm to prepare the sample.

Activated Carbon Sample 5

The granular activated carbon B was pulverized by a roll mill, and then classified with a 60×120 mesh sieve to prepare the sample.

Fibrous Binder

Acrylic fibrous binder: "acrylic fiber Bi-PUL/F" manufactured by Japan Exlan Co., Ltd, CSF value: 90 ml Lead Adsorbent "titanosilicate-based lead remover ATS" (average particle diameter of 20 μm) manufactured by BASF SE First Support Member (Core)

Non-woven fabric: "MF-I Filter (opening: 100 μm, inner diameter: 28 mm, thickness: 1 mm, airflow resistance: 2.0 mm $H_2O$) manufactured by Asahi Fiber Industry Co., Ltd.

Second Support Member (Outer Non-Woven Fabric)

Polypropylene/polyethylene mixed non-woven fabric: product name of "hybon 9540F" (thickens: 0.2 mm, airflow resistance: 4.1 mm $H_2O$) manufactured by SHINWA Co., Ltd.

Water Purification Filter

Example 1

Tap water was added to a total of 1.2 kg of 100 parts by mass of an absorbent (activated carbon sample 1/activated carbon sample 4/activated carbon sample 5/ATS=74/18/3/5) and 5.5 parts by mass of a fibrous binder, to set the amount of a slurry to 20 L.

Figure 4:
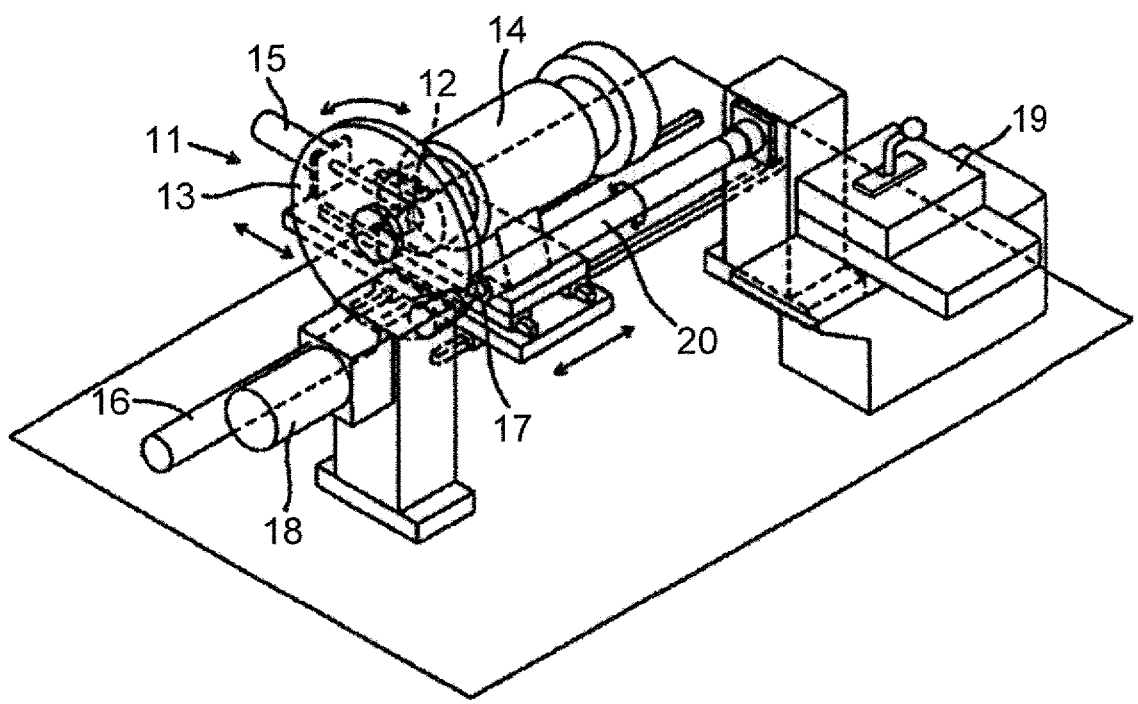
FIG. 4 is a schematic view of an automatic grinder used in Examples.

Next, the core was disposed onto a cylindrical molding mold (outer diameter: 38 mm$_9$, inner shaft diameter: 27.5 mmφ, distance between flanges: 90 mm) as shown in FIG. 1, and a slurry was suctioned until the outer diameter reached 42 mmφ slightly larger than the outer diameter of the mold and then dried. The resultant molded body was mounted on an automatic grinder shown in FIG. 4. The outer surface of the molded body was grinded at a molded-body rotational speed of 360 r/min, at a grindstone rotational speed of 2,535 r/min, and at a grind stone moving speed of 300 mm/10 sec, i.e., 3 cm/sec. The molded body having an outer diameter of 39 mmφ, a core inner diameter of 28 mmφ, and a height of 90 mm as shown in FIG. 2 was consequently prepared. A sheet of the outer non-woven fabric was wound on the outer circumference of the molded body to thereby obtain a hollow cylindrical water purification filter including an activated carbon layer having a thickness of 4.5 mm.

The adsorption filter was accommodated in a transparent plastic housing having an average diameter of 41 mm, a length of about 90.5 mm, and an internal presence amount of about 119.4 ml, and subjected to water passing from the inside to the outside. The aforementioned performances and capabilities were evaluated in accordance with the domestic water purifier testing method. The results are shown in Table 1.

Example 2

Tap water was added to a total of 1.2 kg of 100 parts by mass of an absorbent (activated carbon sample 2/activated carbon sample 5/ATS=93/3/4) and 5.5 parts by mass of a fibrous binder, to set the amount of a slurry to 20 L.

Next, the obtained slurry was suctioned, rolled and molded, and dried to prepare a molded body having an outer diameter of 39 mmφ, an inner diameter of 28 mmφ, and a height of 90 mm in the same manner as Example 1. A sheet of outer non-woven fabric, like the one in the Example 1, was wound on the outer circumference of the molded body to obtain a water purification filter, and the evaluation tests were performed. The results are shown in Table 1.

Example 3

A water purification filter was obtained and the evaluation tests were performed in the same manner as Example 2 except for use of the following core as the first support member. The results are shown in Table 1.
First Support Member (Core)
Polypropylene/polyethylene mixed non-woven fabric (product name of "hybon 9540F", thickens: 0.2 mm, airflow resistance: 4.1 mm H$_2$O, manufactured by SHINWA Co., Ltd.)

Example 4

A water purification filter was obtained and the evaluation tests were performed in the same manner as Example 2 except for use of, as the second support member (outer non-woven fabric), two sheets of polypropylene/polyethylene mixed non-woven fabric (product name of "hybon 9540F", manufactured by SHINWA Co., Ltd.) in a stacked manner to have a thickens of 0.4 mm and an airflow resistance: 6.0 mm H$_2$O. The results are shown in Table 1.

Example 5

A water purification filter was obtained and the evaluation tests were performed in the same manner as Example 2 except for use of the following non-woven fabric as the second support member (outer non-woven fabric). The results are shown in Table 1.
Second Support Member (Outer Non-Woven Fabric)
Polyester non-woven fabric ("Eltas E01012", thickness: 0.1 mm, airflow resistance: 2.0 mm H$_2$O, manufactured by Asahi Kasei Corporation)

Example 6

A water purification filter was obtained and the evaluation tests were performed in the same manner as Example 2 except that the outer diameter of the activated carbon molded body was set to 48 mm. The results are shown in Table 1.

Comparative Example 1

A water purification filter was obtained and the evaluation tests were performed in the same manner as Example 2 except for the setting of the activated carbon sample 5/ATS=96/4. The results are shown in Table 2.

Comparative Example 2

A water purification filter was obtained and the evaluation tests were performed in the same manner as Example 2 except for use of activated carbon 3 in place of activated carbon 2. The results are shown in Table 2.

Comparative Example 3

A water purification filter was obtained and the evaluation tests were performed in the same manner as Example 2 except for use of the following core as the first support member. The results are shown in Table 2.
First Support Member (Core)
Non-woven fabric: "MF-I Filter (opening: 10 μm, inner diameter: 28 mm, thickness: 1 mm, airflow resistance: 20.2 mm H$_2$O) manufactured by Asahi Fiber Industry Co., Ltd.

Comparative Example 4

A water purification filter was obtained and the evaluation tests were performed in the same manner as Example 2 except for use of the following core as the first support member. The results are shown in Table 2.
First Support Member (Core)
Non-woven fabric: "MF-I Filter (opening: 100 μm, inner diameter: 24 mm, thickness: 3 mm, airflow resistance: 21.2 mm H$_2$O) manufactured by Asahi Fiber Industry Co., Ltd.

Comparative Example 5

A water purification filter was obtained and the evaluation tests were performed in the same manner as Example 2 except for use of the following non-woven fabric as the second support member (outer non-woven fabric). The results are shown in Table 2.
Second Support Member (Outer Non-Woven Fabric)
Non-woven fabric: "Eleves T0703WDO" (thickness: 0.2 mm, airflow resistance: 8.7 mm H$_2$O) manufactured by UNITIKA LTD.

Comparative Example 6

A water purification filter was obtained and the evaluation tests were performed in the same manner as Example 2 except that the activated carbon layer had a thickness of 11.0 mm (with an outer diameter of a resultant molded body was 52 mm, after performing the suction, the rolling molding, and the drying in the same manner as Example 1 except that the outer diameter of the cylindrical molding mold was 51 mmφ and the diameter after the slurry suction was 56 mmφ). The results are shown in Table 2.

Comparative Example 7

A water purification filter was obtained and the evaluation tests were performed in the same manner as Example 2 except that the activated carbon layer had a thickness of 2.0 mm (with an outer diameter of a resultant molded body was 34 mm, after perfoHning the suction, the rolling molding, and the drying in the same manner as Example 1 except that the outer diameter of the cylindrical molding mold was 33.5 mmφ and the diameter after the slurry suction was 36 mmφ). The results are shown in Table 2.

TABLE 1

| | Example 1 | Example 2 | Example 3 | Example 4 | Example 5 | Example 6 |
|---|---|---|---|---|---|---|
| Granularity of activated carbon | | | | | | |
| D10 | 32.6 | 77.6 | 77.6 | 77.6 | 77.6 | 77.6 |
| D50 | 148.0 | 141.3 | 141.3 | 141.3 | 141.3 | 141.3 |
| D90 | 219.7 | 209.7 | 209.7 | 209.7 | 209.7 | 209.7 |
| Core | | | | | | |
| | Thickness: 1 mm, Airflow resistance: 2.0 | Thickness: 1 mm, Airflow resistance: 2.0 | Thickness: 0.2 mm, Airflow resistance: 4.1 | Thickness: 1 mm, Airflow resistance: 2.0 | Thickness: 1 mm, Airflow resistance: 2.0 | Thickness: 1 mm, Airflow resistance: 2.0 |
| Non-woven fabric | | | | | | |
| | Thickness: 0.2 mm, Airflow resistance: 4.1 | Thickness: 0.2 mm, Airflow resistance: 4.1 | Thickness: 0.2 mm, Airflow resistance: 4.1 | Thickness: 0.2 mm × 2, Airflow resistance: 6.0 | Thickness: 0.1 mm, Airflow resistance: 2.0 | Thickness: 0.2 mm, Passing resistance: 4.1 |
| Activated carbon layer | | | | | | |
| Thickness | 4.5 mm (39 φ-30 φ) | 4.5 mm (39 φ-30 φ) | 4.5 mm (39 φ-30 φ) | 4.5 mm (39 φ-30 φ) | 4.5 mm (39 φ-30 φ) | 9.0 mm (48 φ-30 φ) |
| Initial filtration flow rate (L/min) | 0.5 | 0.7 | 0.8 | 0.5 | 0.6 | 0.3 |
| Chloroform filtration capability (L) | 790 | 420 | 210 | 350 | 370 | 740 |
| Initial turbidness removal rate (%) | 95% at initial stage | 74% at initial stage | 65% at initial stage | 62% at initial stage | 67% at initial stage | 66% at initial stage |
| Turbidness removal rate at 200 L (%) | 90% | 72% | 64% | 67% | 62% | 62% |
| Filtration flow rate at 200 L (L/min) | 0.6 | 0.9 | 1.0 | 1.1 | 0.7 | 1.0 |
| Soluble lead filtration capability (L) | >1,220 | 390 | 230 | 460 | 350 | >>650 |

TABLE 2

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Granularity of activated carbon | | | | | | | |
| D10 | 175.8 | 40.0 | 77.6 | 77.6 | 77.6 | 77.6 | 77.6 |
| D50 | 248.0 | 95.4 | 141.3 | 141.3 | 141.3 | 141.3 | 141.3 |
| D90 | 328.5 | 151.6 | 209.7 | 209.7 | 209.7 | 209.7 | 209.7 |
| Core | | | | | | | |
| | Thickness: 1 mm, Airflow resistance: 2.0 | Thickness: 1 mm, Airflow resistance: 2.0 | Thickness: 1 mm, Airflow resistance: 20.2 | Thickness: 3 mm, Airflow resistance: 21.2 | Thickness: 1 mm, Airflow resistance: 2.0 | Thickness: 1 mm, Airflow resistance: 2.0 | Thickness: 1 mm, Airflow resistance: 2.0 |

TABLE 2-continued

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Non-woven fabric | Thickness: 0.2 mm, Airflow resistance: 4.1 | Thickness: 0.2 mm, Airflow resistance: 4.1 | Thickness: 0.2 mm, Airflow resistance: 4.1 | Thickness: 0.2 mm, Airflow resistance: 4.1 | Thickness: 0.2 mm, Airflow resistance: 8.7 | Thickness: 0.2 mm, Airflow resistance: 4.1 | Thickness: 0.2 mm, Airflow resistance: 4.1 |
| Activated carbon layer |  |  |  |  |  |  |  |
| Thickness | 4.5 mm (39 φ-30 φ) | 4.5 mm (39 φ-30 φ) | 4.5 mm (39 φ-30 φ) | 4.5 mm (39 φ-30 φ) | 4.5 mm (39 φ-30 φ) | 11.0 mm (52 φ-30 φ) | 2.0 mm (34 φ-30 φ) |
| Initial filtration flow rate (L/min) | 0.9 | 0.1 | 0.0 | 0.1 | 0.1 | 0.1 | 1.6 |
| Chloroform filtration capability (L) | 100 | — | — | — | — | — | 0 (78% at initial stage) |
| Initial turbidness removal rate (%) | 40% at initial stage | — | — | — | 68% at initial stage | — | 33% at initial stage |
| Turbidness removal rate at 200 L (%) | 37% | — | — | — | 54% | — | 3.7% |
| Filtration flow rate at 200 L (L/min) | 1.0 | — | — | — | 0.1 | — | 1.7 |
| Soluble lead filtration capability (L) | 0 (75% at initial stage) | — | — | — | — | — | 0 (61% at initial stage) |

Observation

The water purification filter (in each of Examples 1 to 6) according to the embodiments exhibited a remarkably excellent low-clogging performance while maintaining an excellent liquid permeability and an excellent removal performance on harmful substances and turbid components. Although not shown in Tables, a filter having higher strength and being easier to produce was confirmed to be obtainable as long as each of the first support member and the second support member has a thickness falling within a preferable range (Examples 1 to 2, and 4).

In contrast, the water purification filter in each of Comparative Examples resulted in being inferior in the liquid permeability, the harmful substance removal performance, or the clogging performance.

In Comparative Example 1, D10, D50, and D90 of the activated carbon exceeded each range defined by the present invention, and thus no sufficient removal performance on harmful substances and turbid component was attainable.

In Comparative Example 2, D90 of the activated carbon fell below the range defined by the present invention, and thus a sufficient filtration flow rate was unobtainable. Moreover, the airflow resistance of the first support member (core) in Comparative Examples 3 and 4, and the airflow resistance of the second support member (outer non-woven fabric) in Comparative Example 5 were too high, each resulting in an insufficient filtration flow rate. In Comparative Example 6, the thickness of the activated carbon layer was too large, resulting in an insufficient filtration flow rate. It should be noted here that subsequent performance or capability evaluations (concerning the harmful substance removal performance or capability and the turbidness removal performance or capability) were not performed in Comparative Examples 2 to 4 and 6 where the filtration flow rate was insufficient.

Finally, in Comparative Example 7 where the thickness of the activated carbon layer was too small, no sufficient removal performance on harmful substances and turbid components was attainable.

This application is based on Japanese Patent Application No. 2018-246935 filed in Japan Patent Office on December, 2018, the entire disclosure of which are hereby incorporated by reference.

Although the present invention has been fully described by way of example with reference to the accompanying drawings and above-described specific examples, it is to be understood that various changes and/or modifications will be apparent to those skilled in the art. Therefore, unless otherwise such changes and modifications to be made by those skilled in the art depart from the scope of the present invention hereinafter defined, they should be construed as being included therein.

INDUSTRIAL APPLICABILITY

The present invention has a wide range of industrial applicability in the technical field of water purification and filters.

The invention claimed is:

1. A water purification filter for gravity filtration, comprising:
a first support member;
an activated carbon layer containing activated carbon and a fibrous binder; and
a second support member, wherein
the water purification filter is suitable for gravity filtration,
the first support member is arranged as a core on an inner circumference of the activated carbon layer, and the second support member is arranged on an outer circumference of the activated carbon layer,
a 10% particle diameter (D10) of the activated carbon in a cumulative size distribution at volume standard is 19 to 90 μm, a 50% particle diameter (D50) of the activated carbon in the cumulative size distribution at volume standard is 120 to 180 μm, and a 90% particle diameter (D90) of the activated carbon in the cumulative size distribution at volume standard is 180 to 250 μm, the first support member has an airflow resistance of 0.5 to 10 mm $H_2O$ and is made of a non-woven fabric composed of a polyethylene resin, a polypropylene resin, a vinylon resin, an aramid resin, a nylon resin, a vinyl chloride resin, or a mixed resin in combination of two or more these resins, the second support member has an airflow resistance of 0.5 to 7 mm $H_2O$, and the activated carbon layer has a thickness of 3 to 10 mm.

2. The water purification filter according to claim 1, wherein the first support member has a thickness of 0.2 to 2.0 mm.

3. The water purification filter according to claim 1, wherein the second support member is made of non-woven fabric.

4. A water purifier comprising the water purification filter according to claim 1.

5. The water purification filter according to claim 1, wherein the activated carbon layer has a cylindrical shape.

* * * * *